United States Patent
Liao

(10) Patent No.: US 12,107,704 B2
(45) Date of Patent: Oct. 1, 2024

(54) METHOD FOR NETWORK SLICES TO SHARE UPLINK PORT, APPARATUS, AND STORAGE MEDIUM

(71) Applicant: XI'AN ZHONGXING NEW SOFTWARE CO., LTD., Xi'An (CN)

(72) Inventor: Yongjun Liao, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 294 days.

(21) Appl. No.: 17/770,849

(22) PCT Filed: Sep. 28, 2020

(86) PCT No.: PCT/CN2020/118452
§ 371 (c)(1),
(2) Date: Apr. 21, 2022

(87) PCT Pub. No.: WO2021/077995
PCT Pub. Date: Apr. 29, 2021

(65) Prior Publication Data
US 2022/0385497 A1    Dec. 1, 2022

(30) Foreign Application Priority Data
Oct. 21, 2019    (CN) .......................... 201911002179.3

(51) Int. Cl.
*H04L 12/46*    (2006.01)
(52) U.S. Cl.
CPC ................................. *H04L 12/467* (2013.01)

(58) Field of Classification Search
CPC .............. H04L 12/467; H04L 12/4633; H04L 12/4675; H04L 41/0895; H04L 12/4604;
(Continued)

(56) References Cited

U.S. PATENT DOCUMENTS 9,886,445 B1    2/2018  Gupta et al.
10,997,106 B1*  5/2021  Bandaru ............... G06F 13/385
(Continued)

FOREIGN PATENT DOCUMENTS

CN    108809672 A    11/2018
CN    108989915 A    12/2018
(Continued)

OTHER PUBLICATIONS

International Searching Authority. International Search Report and Written Opinion for PCT Application No. PCT/CN2020/118452 and English translation, mailed Jan. 4, 2021, pp. 1-10.
(Continued)

*Primary Examiner* — Abdullahi Ahmed
(74) *Attorney, Agent, or Firm* — Vivacqua Crane, PLLC

(57) ABSTRACT

A method for sharing an uplink port among network slices, an apparatus, and a non-transitory computer-readable storage medium are disclosed. The method may include: creating logical uplink ports of network slices (S201); establishing a one-to-one logical mapping between the logical uplink ports and access AC interfaces of a VXLAN in a shared slice (S202); and enabling the VXLAN in the shared slice, and transmitting, by means of a physical uplink port of the shared slice, service messages for the network slices (S203).

17 Claims, 5 Drawing Sheets

(58) Field of Classification Search
CPC ......... H04L 2012/4629; H04L 41/0893; H04L 12/4641
See application file for complete search history.

(56) References Cited

U.S. PATENT DOCUMENTS

| | | | | |
|---|---|---|---|---|
| 2016/0337206 | A1* | 11/2016 | Bugenhagen | H04L 67/02 |
| 2017/0308395 | A1* | 10/2017 | Cook | H04L 45/64 |
| 2019/0141036 | A1* | 5/2019 | Shi | H04L 12/4633 |
| 2020/0196194 | A1* | 6/2020 | Kozat | H04L 41/0806 |
| 2021/0184970 | A1* | 6/2021 | Hong | H04L 45/64 |
| 2022/0321380 | A1* | 10/2022 | Zhang | H04L 45/66 |

FOREIGN PATENT DOCUMENTS

| | | |
|---|---|---|
| CN | 109842507 A | 6/2019 |
| WO | 2018196671 A1 | 11/2018 |
| WO | 2019075479 A1 | 4/2019 |

OTHER PUBLICATIONS

3GPP Technical Specification Group Radio Access Network. "Selection RAN Part Network Slice during UE mobility," 3GPP TSG-RAN WG3 NR Meeting, Jan. 17-19, 2017, pp. 1-7.
ETSI Industry Specification Group on Next Generation Protocols (ISG NGP). "NGP; E2E Network Slicing Reference Framework and Information Model," Draft ETSI GR NGP 011, 2018, pp. 1-34.
European Patent Office. Extended European Search Report for EP Application No. 20879079.0, mailed Oct. 10, 2022, pp. 1-9.
Intellectual Property India. Examination Report for IN Application No. 202227028638 and English translation, mailed Oct. 31, 2022, pp. 1-6.

* cited by examiner

METHOD FOR NETWORK SLICES TO SHARE UPLINK PORT, APPARATUS, AND STORAGE MEDIUM

CROSS-REFERENCE TO RELATED APPLICATION

This application is a national stage filing under 35 U. S.C. § 371 of international application number PCT/CN2020/118452, filed on Sep. 28, 2020, which claims priority to Chinese patent application No. 201911002179.3 filed on Oct. 21, 2019. The contents of these applications are incorporated herein by reference in their entirety.

TECHNICAL FIELD

Embodiments of the present disclosure relate to, but are not limited to, the technical field of communications, and in particular relate to, but are not limited to, a method for sharing an uplink port among network slices, an apparatus, and a non-transitory computer-readable storage medium.

BACKGROUND

With the development of communication technology, network systems also need to support new diversification, and network operation and maintenance have become extremely complex due to the gradual increase in network complexity, causing a single network architecture to be unable to cope with diverse application scenarios. Therefore, in order to reduce excessive operational difficulty and operation and maintenance costs, it is usually necessary to further abstract the network into network slices to meet the needs of different services, and isolate the network slices from each other, so that different network slices can implement their respective functions in corresponding application scenarios, thereby reducing the overall complexity of the network and operation and maintenance costs.

Network slices can realize different scenarios for user equipment, and for each network slice, the configuration information on the access layer, the configuration information on the access network side, and the configuration information on the core network entity are unique, that is, different from the configuration information for other network slices, which is caused by the difference in services provided by the network slices. For different "private networks", ports interfacing with upstream devices on the network side must also be required in different "private networks". That is, different network slices have to communicate with upstream interfacing devices through different uplink ports, resulting in redundant interfacing of ports on the network side. Therefore, a considerable number of ports are required to interface with the network side, and there are many more interfacing ports for networking of upstream devices, which is bound to waste resources.

SUMMARY

The method for sharing an uplink port among network slices, the apparatus, and the non-transitory computer-readable storage medium according to the embodiments of the present disclosure at least solve the technical problem to a certain extent that, in some situations, different network slices have to communicate with upstream interfacing devices through different uplink ports, resulting in redundant interfacing of ports on the network side and shortage of network slice resources.

In order to at least solve the above technical problem in some situations to a certain extent, an embodiment of the present disclosure provides a method for sharing an uplink port among network slices, which may include: creating logical uplink ports for network slices; establishing a one-to-one logical mapping between the logical uplink ports and access AC interfaces of a VXLAN in a shared slice; and enabling the VXLAN in the shared slice, and transmitting service messages for the network slices through a physical uplink port for the shared slice.

An embodiment of the present disclosure further provides an apparatus, which may include a processor, a memory and a communication bus, where the communication bus is configured to implement connection and communication between the processor and the memory; and the processor is configured to execute one or more programs stored in the memory to implement the method for sharing an uplink port among network slices as described above.

An embodiment of the present disclosure further provides a non-transitory computer-readable storage medium storing one or more programs, where the one or more programs are executable by one or more processors to implement the method for sharing an uplink port among network slices as described above.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure more clearly understood, the embodiments of the present disclosure will be further illustrated in detail by means of specific embodiments in conjunction with the accompanying drawings. It should be understood that the specific embodiments described here are intended only to explain the present disclosure and are not intended to limit the present disclosure.

Example Embodiment I

Figure 1:
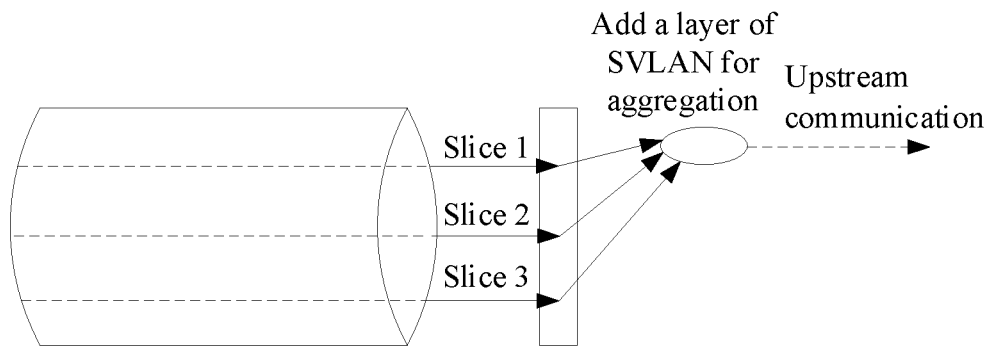
FIG. 1 is a schematic diagram of the arrival of services at an uplink port shared by slices in the related technology.

As shown in FIG. 1, in the related technology, the common practice for a service to arrive at an uplink port shared by slices is as follows: a layer of SVLAN is added on top of independent slice uplink ports and then switched into slice 0, and then the uplink port shared in slice 0 communicates with the upstream devices, i.e., the shared uplink port distinguishes different slices in the forwarding plane through different VLANs, so that the data can be forwarded in the respective slices. However, this approach has the following drawback: the same SVLAN cannot exist in different slices at the same time, and there is a limit of 4096 on the number of VLANs, which violates the principle of independent operation of slices and increases the burden of MAC learning. In order to at least solve the above problem in some situations to a certain extent, the embodiments of the present disclosure provides a method for sharing an uplink port among network slices, i.e., a method for network slices to share a set of uplink ports through a VXLAN to interface with upstream devices, which enables the forwarding of service streams of the network slices by means of VXLAN sharing, where the logical mapping between the logical uplink ports for the network slices and the shared VXLAN access ports is established directly through internal configuration, and the VXLAN ID (VNI) is utilized to break through the limitation of the 0-4094 range segment to completely achieve the purpose of sharing an uplink port among the network slices, and in the process of establishing the logical mapping, the logical ports for the network slices can perform switching without learning MAC, thus greatly reducing the MAC learning process and suppressing problems such as broadcast storms. It can be understood that the VXLAN is a network virtualization technique in Network Virtualization over Layer3 (NVO3), where a data packet sent by a Virtual Machine (VM) or a physical server is encapsulated in the User Datagram Protocol (UDP) and encapsulated with the IP/MAC of the physical network as the message header, and is then transmitted over the IP network, and after reaching the destination, it is de-encapsulated by the tunnel terminator, and the data is sent to the target VM or physical server.

Figure 2:
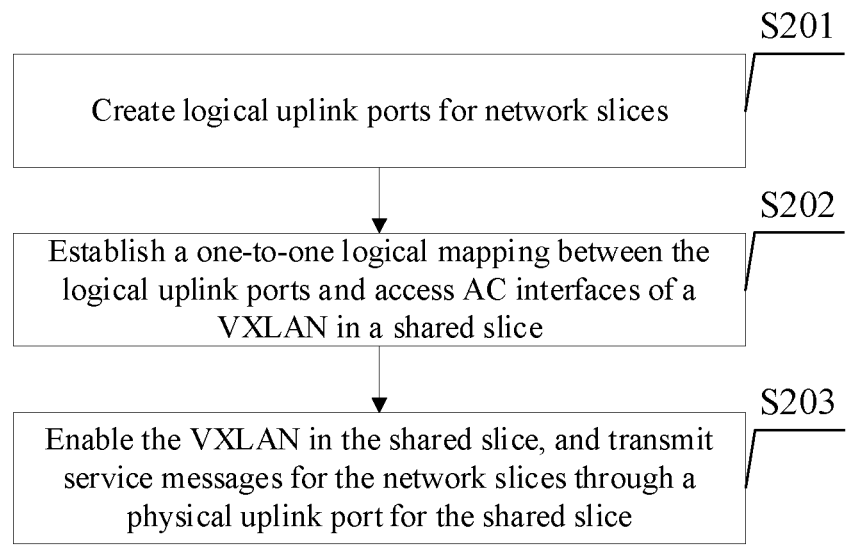
FIG. 2 is a flowchart of a method for sharing an uplink port among network slices of example embodiment I of the present disclosure.

Referring to FIG. 2, FIG. 2 illustrates a method for sharing an uplink port among network slices provided in an embodiment of the present disclosure, the method for sharing an uplink port among network slices including the following steps.

At S201, logical uplink ports are created for network slices.

In the embodiment of the present disclosure, different slices are obtained by means of division, and the slices include shared slices and network slices corresponding to user ports, where a slice (LR0) may serve as a shared slice, and later it is determined to which network slices the user ports are to be allocated, each user port belonging to a network slice. Here, different user ports may belong to different network slices, for example, user port 1 belongs to network slice 1 and user port 2 belongs to network slice 2; or a user port may belong to multiple network slices, for example, user port 1 belongs to network slice 1 and network slice 2.

A logical uplink port VETH is created in each network slice. For example, logical uplink ports VETH1, VETH2, and VETH3 are created in network slice 1 (LR1), network slice 2 (LR2), and network slice 3 (LR3), respectively. The network slices treat these interfaces as ordinary Ethernet ports, which may be configured with VLAN and other information.

At S202, a one-to-one logical mapping is established between the logical uplink ports and access AC interfaces of a VXLAN in a shared slice.

In an embodiment of the present disclosure, the logical uplink ports for the network slices are mapped to the access ports for the VXLAN on a one-to-one basis to serve as access Attachment Circuit (AC) users of the VXLAN. Specifically, logical ports VETH_X are created on the shared slice in such a manner that the logical ports correspond to the logical uplink ports on a one-to-one basis. For example, logical ports VETH_X1, VETH_X2, and VETH_X3 are created on the shared slice (LR0) in such a manner that they correspond to logical uplink port VETH1 of LR1, logical uplink port VETH2 of LR2, and logical uplink port VETH3 of LR3 on a one-to-one basis, respectively, and the logical ports access the VXLAN as AC interfaces. In the forwarding-plane implementation, the situation is equivalent to connecting the two interfaces VETH_X1 and VETH1 together, and when the data stream from network slice 1 reaches VETH1, it is equivalent to being diverted to the VETH_X1 port. In this case, the logical uplink ports VETH1, VETH2, and VETH3 of the network slices access the VXLAN as the VMs of the VXLAN.

At S203, the VXLAN is enabled in the shared slice, and service messages for the network slices are transmitted through a physical uplink port for the shared slice.

The VXLAN is enabled in the shared slice, and the VXLAN encapsulates raw messages sent by VMs and then transmits the encapsulated messages through a VXLAN tunnel, where VMs at both ends of the tunnel do not need to be aware of the physical architecture of the transmission network. Thus, for VMs with the same network segment IP address, they are still logically equivalent to being in the same layer-2 domain, even if they are not physically located in the same layer-2 network. That is, VXLAN technology builds a virtual large layer-2 network on top of the layer-3 network and, as long as a VM is routable, it may be planned into the same large layer-2 network.

In an embodiment of the present disclosure, after the network slices access the VXLAN through the logical ports VETH_X, the VXLAN communicates with the outside world through the layer-3 switching network. Here, a VXLAN tunnel is created in the shared slice, where the VXLAN tunnel includes source IPs, destination IPs, and VNIs, and different VXLAN Tunnel End Points (VTEPs) are divided according to the source IPs, the destination IPs, and the VNIs. For example, the VXLAN tunnel includes VTEP1 (S-IP1, D-IP2, including VNI1); and VTEP2 (S-IP3, D-IP4, including VNI3). In some embodiments, the same VTEP may also correspond to different VNIs, e.g., VTEP1 (S-IP1, D-IP2; including VNI1 and VNI2), Here, the VNIs may be allocated by the shared slice, and AC interfaces are added to VNIs of different VTEPs, so that VNIs correspond to AC interfaces on a one-to-one basis. Since the AC interfaces correspond to the network slices on a one-to-one basis, each network slice corresponds to one VNI. For example, network slice 1 corresponds to VNI1; network slice 2 corresponds to VNI2, then it communicates with the peer through VTEP1; network slice 3 corresponds to VNI3, then it communicates with the peer through VTEP2. Because one physical uplink port can carry communications of multiple VTEPs, the purpose of sharing the physical uplink port for data switching among network slices is achieved.

It is worth noting that the network slices share the physical uplink port for data switching includes performing VXLAN encapsulation after the service messages of the network slices are mapped to the AC interfaces through the logical uplink ports. It should be noted that the VNIs in the embodiment of the present disclosure correspond to the AC interfaces on a one-to-one basis, and the service messages may be transmitted to peer devices according to VTEPs to which the AC interfaces belong. For example, after the user service stream of network slice 1 is switched to VETH1, layer-2 switching is performed between the user port for network slice 1 and the logical uplink port VETH1 through VLAN and MAC, after which the service stream of VETH1 is directly mapped to the corresponding logical port VETH_X1 in the shared slice according to the logical mapping; in the shared slice, VETH_X1 is an AC user of the VXLAN, and when the service stream reaches the AC port, it encapsulates a VXLAN header according to the VXLAN characteristics, and then transmits the encapsulated service stream to the peer device according to VTEP1 to which VETH_X1 belongs. Therefore, after the service message of a slice user is encapsulated with the VXLAN header, it arrives at the peer VTEP device through the VXLAN tunnel. The peer device receives the message, and then strips the VXLAN header, takes out the payload, and performs layer-2 or layer-3 switching to the peer user side according to the VLAN, MAC or IP information in the payload. In this way, network slice services can be isolated from each other, physical ports can be saved, and IP or MAC address learning depth can be saved. When the VLAN, MAC and IP in the service flow messages of the user ports are the same, the normal switching can also be ensured by using VXLAN to share the physical uplink port, which is equivalent to the case where the service streams of the network slices may be the same services, and may be normally switched after sharing the physical uplink port for the VXLAN, without leading to the situation where the switching cannot be performed due to conflicts caused by the same VLAN, MAC and IP.

In an embodiment of the present disclosure, layer-2 protocol messages may also be communicated normally in the layer-3 network. When transmitting the service messages of the network slices, layer-2 protocol messages, such as IGMP, PPPOE and other layer-2 protocol messages, are delivered in a layer-3 network by means of VXLAN encapsulation. In this case, after the service messages are encapsulated with VXLAN headers, they are transmitted to the layer-3 network through the physical uplink port for the shared slice to implement communication in the layer-3 network, thus enhancing the penetration of the layer-2 protocol messages and making the messages more securely transmitted in the network, with better confidentiality and much lower cost.

With the method for sharing an uplink port among network slices provided by embodiments of the present disclosure, the network slices can share the physical uplink port for the shared slice for communication with interfacing devices, thereby saving physical uplink ports while enabling isolation of services of the network slices. By achieving slice sharing using VXLAN, any layer-2 messages or layer-3 messages can be encapsulated in UDP as payloads, and their message contents will not be changed. Such a data packet uses the IP/MAC address of the physical network as the outer header for encapsulation, so only the encapsulated parameters are presented to the network. Therefore, the requirement for MAC address specifications in the large layer-2 network is greatly reduced. When a device (including an interfacing device) is migrated, only the tunnel address needs to be changed to migrate, thus ensuring that parameters such as the user IP address and the MAC address remain unchanged, thus reducing network maintenance costs.

In an embodiment of the present disclosure, after the service messages for the network slices are transmitted through the physical uplink port for the shared slice, data messages sent by peer devices will be received. In this case, AC interfaces are looked up according to VNIs corresponding to VTEPs. For example, in response to the corresponding VETH_X1 being found according to VNI1, before the data message reaches VETH_X1, the data message is de-encapsulated to obtain a payload message, i.e., the VXLAN header is stripped and the payload is taken out. Then, according to the logical mapping of the searched AC interface to the logical uplink port, the payload message is transmitted to the corresponding network slice. For example, when the payload message is switched to the VETH_X1 port, since there is a one-to-one correspondence between VETH_X1 and VETH1 of network slice 1, at this time, as the user access port for VXLAN, VETH1_X1 may be switched to the logical uplink port for network slice 1 without learning MAC in the VXLAN shared slice, thus saving the MAC learning process and resources, and achieving higher switching efficiency.

It should be noted that before accessing the VXLAN, the data switching system for the network slices is considered to be a layer-2 switching network, i.e., performing switching according to the MAC and the VLAN; and after accessing the VXLAN via the logical port, the VXLAN communicates with the outside world through the layer-3 switching network. In this two-level switching system, in the present disclosure, different priorities may be set according to the importance of users for data scheduling, thus ensuring that data is preferentially allocated to slices where important users are located. Specifically, after the AC interfaces are found according to VNIs corresponding to VTEPs and the data messages are de-encapsulated to obtain payload messages, the payload messages are stored into the priority scheduling queue for priority scheduling according to the preset priority rule, and the higher the priority of a payload message in the queue, the higher the priority of the payload message to be switched into the network slice. Here, the preset priority rule may be customarily set. For example, it may be determined based on the VNI and the VETH_X, or may be determined based on the VNI or PORT value. For example, in response to a VNI value of 1 having a higher priority than a VNI of 2, the payload message corresponding to the VNI value of 1 is preferentially exchanged out of the queue. For another example, in response to the priority of the PORT value of 3 being higher than the PORT value of 2, the payload message corresponding to the PORT value of 2 is preferentially exchanged out of the queue.

In an embodiment of the present disclosure, after the payload messages are transmitted to the corresponding network slices, load balancing may be conducted on the data of the network slices according to the actual needs, making the data of the network slices more secure and more efficient for switching. Specifically, in response to a user port being shared in at least two network slices, the payload messages are switched from different network slices to the user port according to the principle of load balancing. For example, user port 1 is distributed in both network slice 1 and network slice 2, that is, the user port is shared in the network slices. When accessing the same resource, load balancing may be conducted in the two-level switching system and the payload message is sent to the user port from different network slices. For example, when the load of network slice 1 is greater than that of network slice 2, 70% of the payload message is switched to user port 1 through network slice 2, and 30% of the payload message is switched to user port 1 through network slice 1. Here, the network slice plays a load-sharing role.

The method for sharing an uplink port among network slices provided in the embodiments of the present disclosure is used to solve the problem of tight network slice resources in some situations at least to a certain extent, and messages such as layer-2 protocol messages can be carried in a layer-3 switching network by means of VXLAN encapsulation, which enhances the penetration of the layer-2 protocol messages and makes the messages more secure in network transmission, with better confidentiality and much lower cost. Moreover, as a two-level switching system, VETH_X port, which serves as an AC access of the VXLAN, does not need to learn MAC, thus reducing the MAC learning process. At the same time, in a two-level switching system, important data can reach important slices preferentially according to the priority, and load balancing between slices can also be achieved, thus enhancing bandwidth utilization.

Example Embodiment II

Figure 3:
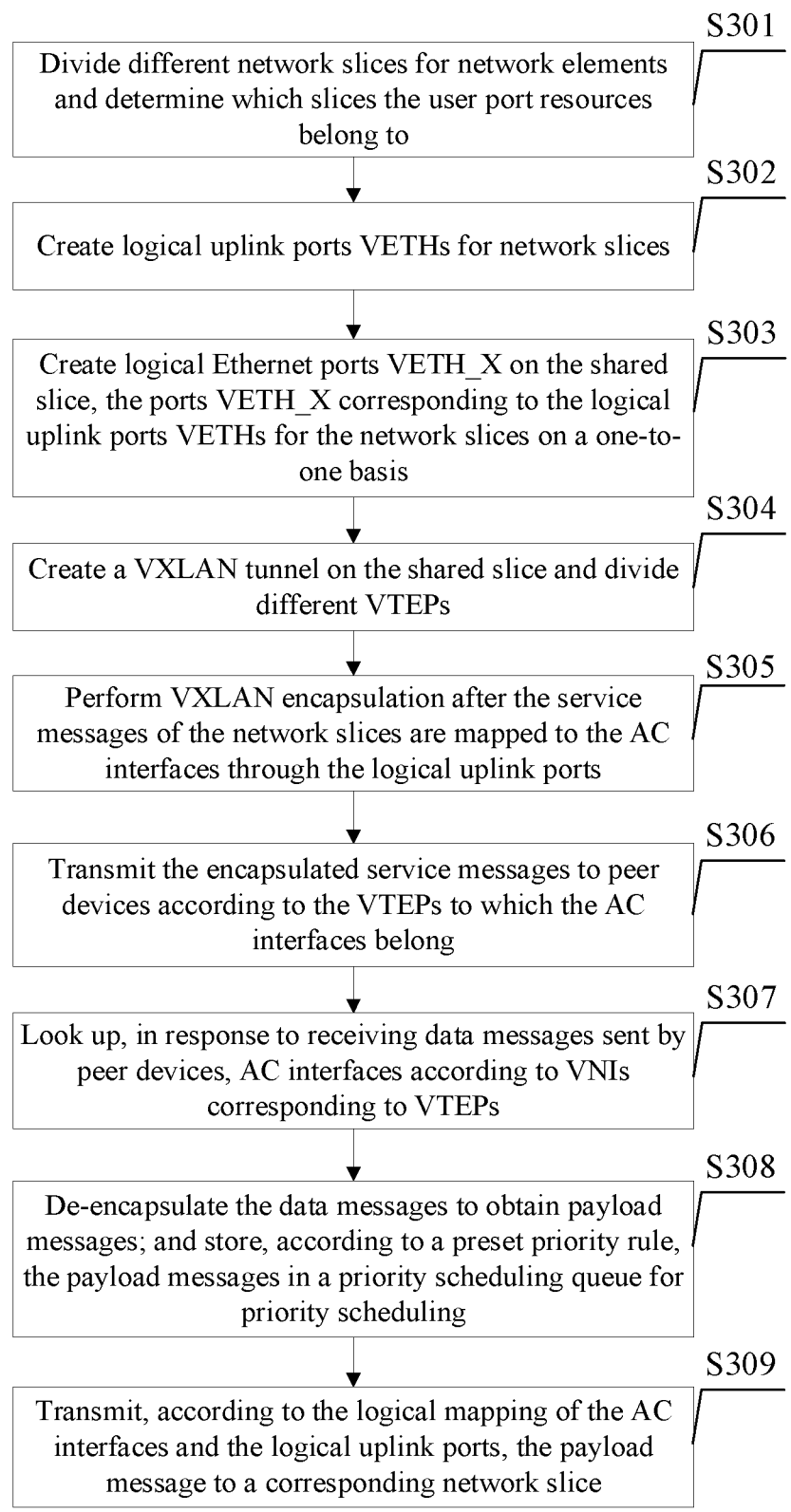
FIG. 3 is a flowchart of a method for sharing an uplink port among network slices of example embodiment II of the present disclosure.

An embodiment of the present disclosure provides a method for sharing an uplink port among network slices. As shown in FIG. 3, the method for sharing an uplink port among network slices includes the following steps.

At S301, different network slices are divided for network elements, and it is determined which slices the user port resources belong to.

Assuming that the network element includes shared slice 0 and network slice 1, network slice 2, and network slice 3, where network slice 1 is allocated to user port 1, network slice 2 is allocated to user port 2, and network slice 3 is allocated to user port 3.

At S302, logical uplink ports VETH for network slices are created.

In network slice 1, network slice 2 and network slice 3, logical uplink ports VETH1, VETH2, and VETH3 are created, respectively, to serve as ordinary Ethernet ports, allowing VLAN and other information to be configured.

At S303, logical Ethernet ports VETH_X are created on the shared slice in such a manner that the logical Ethernet ports VETH_X correspond to the logical uplink ports VETH for the network slices on a one-to-one basis.

The logical ports VETH_X1, VETH_X2, and VETH_X3 are created on the shared slice 0 in such a manner that they correspond to the logical uplink port VETH1 for slice 1, the logical uplink port VETH2 for slice 2, and the logical uplink port VETH3 for slice 3 on a one-to-one basis, respectively, where VETH_X1, VETH_X2 and VETH_X3 serve as the access AC ports for the VXLAN.

At S304, a VXLAN tunnel is created on the shared slice and different VTEPs are divided.

The VXLAN tunnel includes source IPs, destination IPs, and VNIs. The VNIs may be allocated to network slices by the shared slice, and different VTEPs may be divided according to the source IPs, the destination IPs, and the VNIs of the VXLAN tunnel. Assuming that VTEP1 has S-IP1 and D-IP1, and VNI1 corresponds to VETH_X1; VTEP2 has S-IP2 and D-IP2, and VNI2 corresponds to VETH_X2; and VTEP3 has S-IP3 and D-IP3, and VNI3 corresponds to VETH_X3.

At S305, VXLAN encapsulation is performed after the service messages of the network slices are mapped to the AC interfaces through the logical uplink ports.

After the service messages of the network slices reach the VETH, they are directly mapped to the VETH_X ports. For example, a service message is mapped to the VETH_X1 through VETH1, and a VXLAN header is encapsulated in the VETH_X1.

At S306, the encapsulated service messages are transmitted to peer devices according to the VTEPs to which the AC interfaces belong.

According to the VNIs, the corresponding VTEPs are determined, and network slice 1, network slice 2 and network slice 3 transmit the encapsulated service messages to the peer VTEP devices through the VXLAN tunnel formed by VTEP1, VTEP2, and VTEP3, respectively.

At S307, in response to receiving data messages sent by peer devices, AC interfaces are looked up according to VNIs corresponding to VTEPs.

The data messages are received from the VXLAN tunnel side, and the local VTEP finds the network slices according to the VNIs and the AC interfaces according to the network slices.

At S308, the data messages are de-encapsulated to obtain payload messages, and according to a preset priority rule, the payload messages are stored in a priority scheduling queue for priority scheduling.

Before the data messages reach the AC interfaces (VETH_X), the VXLAN headers are stripped and the payload messages are taken out. According to the set VNI-to-priority correspondence, the payload messages enter the priority scheduling queue. The higher the priority of a payload message in the queue, the higher the priority of the payload message to be switched into the network slice. For example, VNI1 has the highest priority, followed by VNI2, and finally VNI3, then the payload messages of network slices 1, 2 and 3 will enter the priority scheduling queue in sequence, and the payload message of network slice 1 will be preferentially switched out of the queue.

At S309, according to the logical mapping of the AC interfaces and the logical uplink ports, the payload messages are transmitted to corresponding network slices.

For example, according to the mapping relationship between VETH_X1 and logical uplink port VETH1 for network slice 1, the payload message is switched to network slice 1.

According to the method for sharing an uplink port among network slices provided in the embodiments of the present disclosure, a same uplink port may be shared by multiple network slices, and the sharing manner is supported by associating different VXLAN tunnels. The VXLAN is enabled in shared slice 0, and is divided into different VTEPs according to the VNIs to communicate with the peer devices, while the AC access ports for the VXLAN are the logical ports VETH_X for the network slices. After the service streams of the network slices reach the logical port VETH_X, they are encapsulated with VXLAN headers, aggregated at the shared physical uplink port for shared slice 0, and then switched to the peer devices through the VTEPs according to the VNIs of the VXLAN. After the switching to the peer devices, the VXLAN headers are stripped, the payloads are taken out, and then switched to the peer user side by means of layer-2 or layer-3 switching according to the VLAN, MAC or IP information in the payloads. In this way, slice services can be isolated from each other, physical ports can be saved, and IP or MAC address learning depth can be saved; it is possible to well achieve the goal of isolating network slices from each other while saving physical uplink ports; when the slicing logical port accesses the VXLAN as an AC, its logical port can perform access and switching without learning MAC, thus improving the switching efficiency, and at the same time, in the two-level switching system constructed, the data stream can be ensured to enter more important slices preferentially based on priority scheduling.

Example Embodiment III

Figure 4:
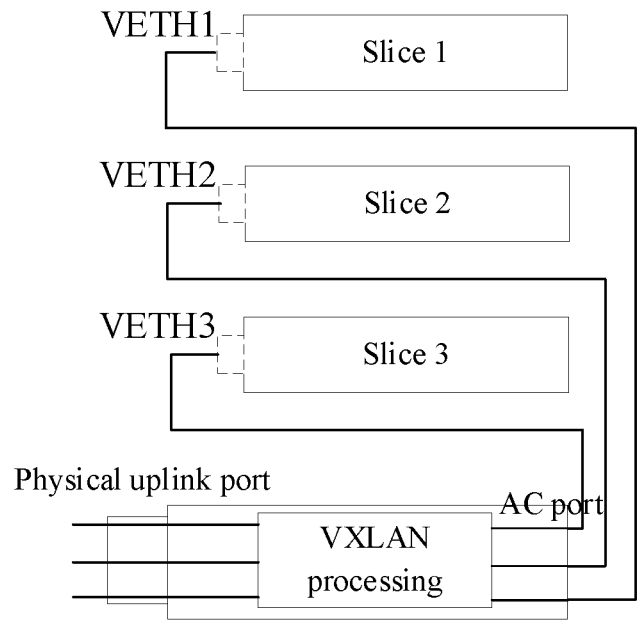
FIG. 4 is a schematic diagram of logical uplink ports for network slices and an AC port for the VXLAN of example embodiment III of the present disclosure.
Figure 5:
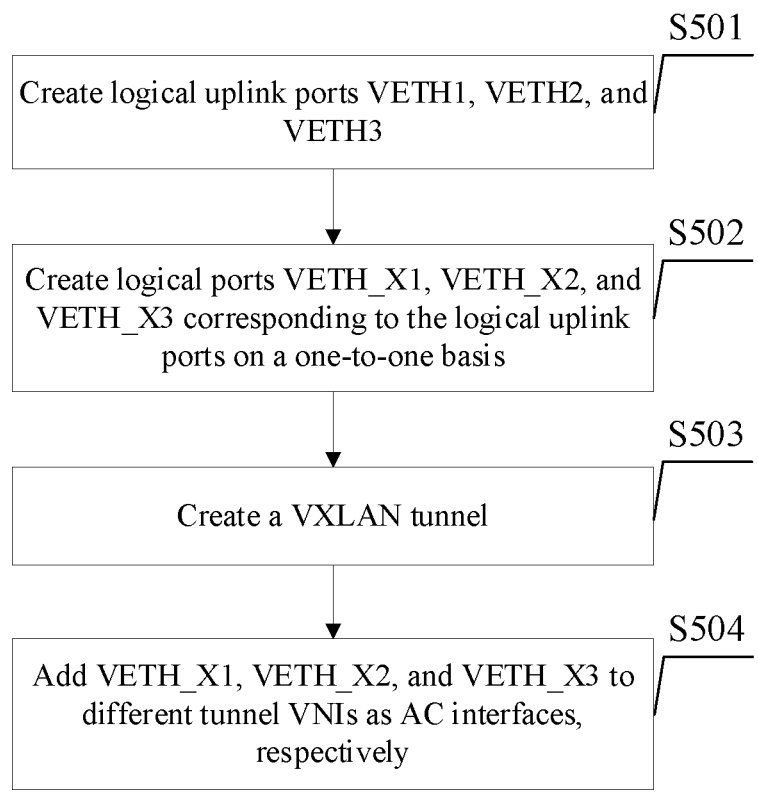
FIG. 5 is a flowchart for establishing a correspondence between logical uplink ports for network slices and an AC port for the VXLAN of example embodiment III of the present disclosure.

In order to facilitate understanding, the embodiments of the present disclosure use a specific example to illustrate the process of establishing a correspondence between logical uplink ports for network slices and AC ports for the VXLAN. As shown in FIGS. 4 and 5, the process includes the following steps.

At S501, logical uplink ports VETH1, VETH2, and VETH3 are created and allocated to slice 1, slice 2, and slice 3, respectively, where these interfaces are treated as ordinary Ethernet ports in slices and may be used for VLAN configuration, MAC learning, etc.

At S502, logical ports VETH_X1, VETH_X2, and VETH_X3 are created, where these logical ports serve as access AC ports for the VXLAN and correspond to logical uplink ports VETH1, VETH2, and VETH3 for slice 1, slice 2, and slice 3 on a one-to-one basis, respectively.

At S503, a VXLAN tunnel is created, including VTEP1 (source IP/destination IP: S-IP1/D-IP2, including VNI1 and VNI2) and VTEP2 (S-IP3/D-IP4, including VNI3).

At S504, VETH_X1, VETH_X2 and VETH_X3 are added to different tunnel VNIs as AC interfaces, respectively.

Figure 6:
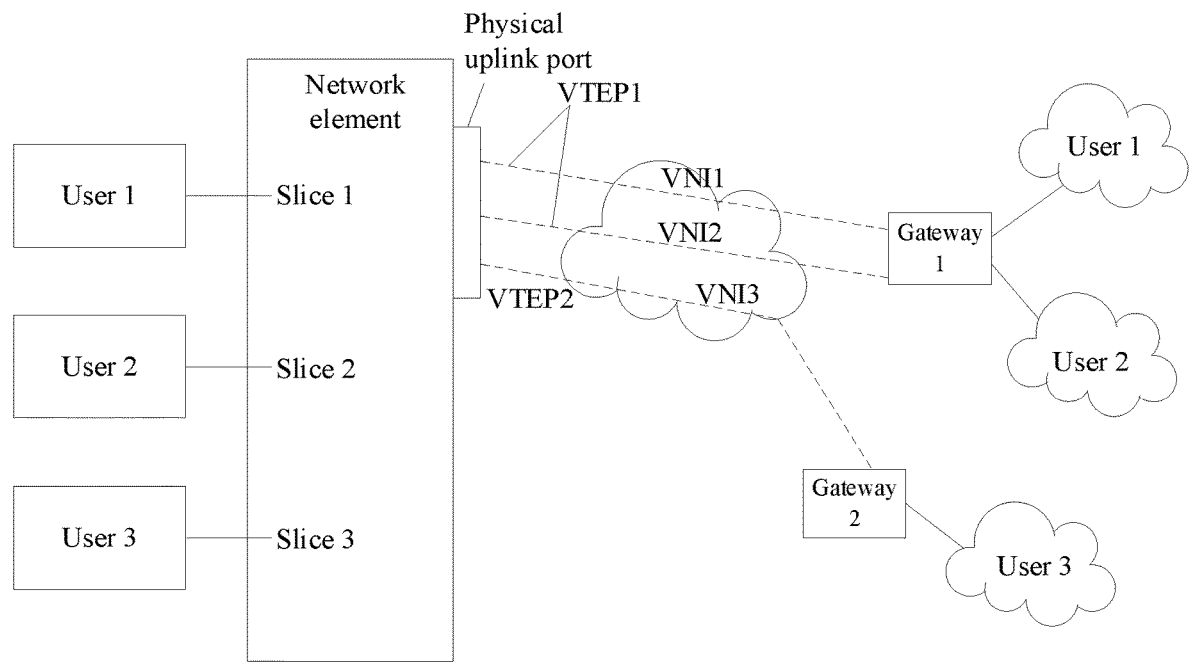
FIG. 6 is a schematic diagram of networking of network slices by sharing the uplink port via the VXLAN of example embodiment III of the present disclosure.

An embodiment of the present disclosure further provides a schematic diagram of networking by sharing an uplink port among network slices through the VXLAN. Here, a second-level switching system is built on a network element to improve the efficiency of data access for virtual and physical machines, while saving public IP resources as well as improving data security and physical compatibility, taking into account the application of layer-2 and layer-3 network topologies. As shown in FIG. 6:
1) multiple slices 1-3 of the network element share a physical uplink port, and the data stream of each slice on the uplink port is encapsulated with VXLAN;
2) slice 1 and slice 2 pass through the same VTEP1, different VNIs (VNI1 and VNI2) form a VXLAN tunnel to cross the switching network, and the slices are de-encapsulated in VXLAN gateway 1, and then the traffics are sent to the networks for user 1 and user 2, respectively; and
3) slice 3 passes through VTEP2, VNI3 forms a VXLAN tunnel to cross the switching network, and the slice is de-encapsulated in VXLAN gateway 2, and then the traffic is sent to the network for user 3.

Figure 7:
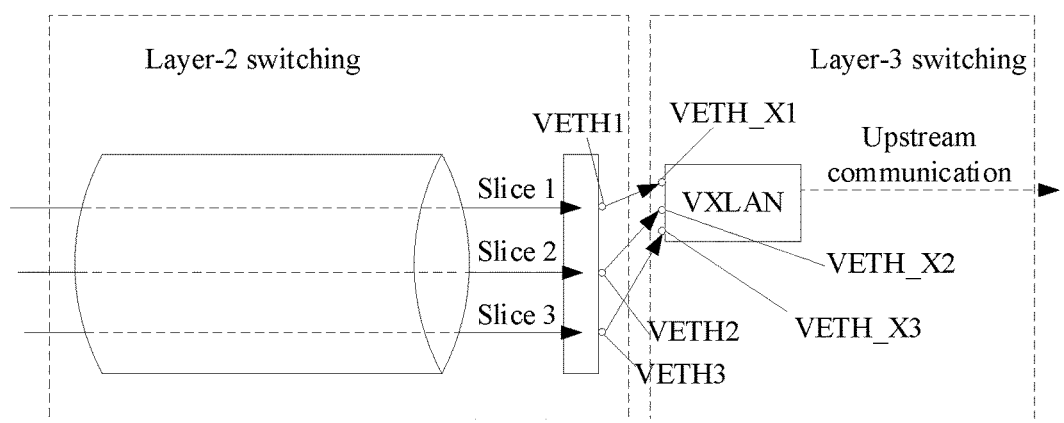
FIG. 7 is a schematic diagram of the priority scheduling of a two-level switching system for network slices of example embodiment III of the present disclosure.

An embodiment of the present disclosure further provides a schematic diagram of priority scheduling of a two-level switching system for network slices. As shown in FIG. 7, layer-2 switching is performed between user ports for the slices and the logical uplink ports VETH1 through VLAN and MAC. After accessing the VXLAN system by taking VETH_X1 as AC, layer-3 switching is performed to communicate with upstream devices. After downlink data passes through the VXLAN, it should be transferred to the slices. At this time, priority scheduling may be carried out according to the rule, for example, depending on the VNIs, thus ensuring that the data is preferentially switched to important slices. Further, if a certain user port is allocated both in slice 1 and in slice 2, that is, this user port is shared between the slices, in response to the upstream data accessed by this user reaching the layer-3 switching system of the VXLAN, it may be sent from different slices to the user port according to the principle of load balancing of the slices. Here, the logical uplink ports for the slices play a load-sharing role.

Figure 8:
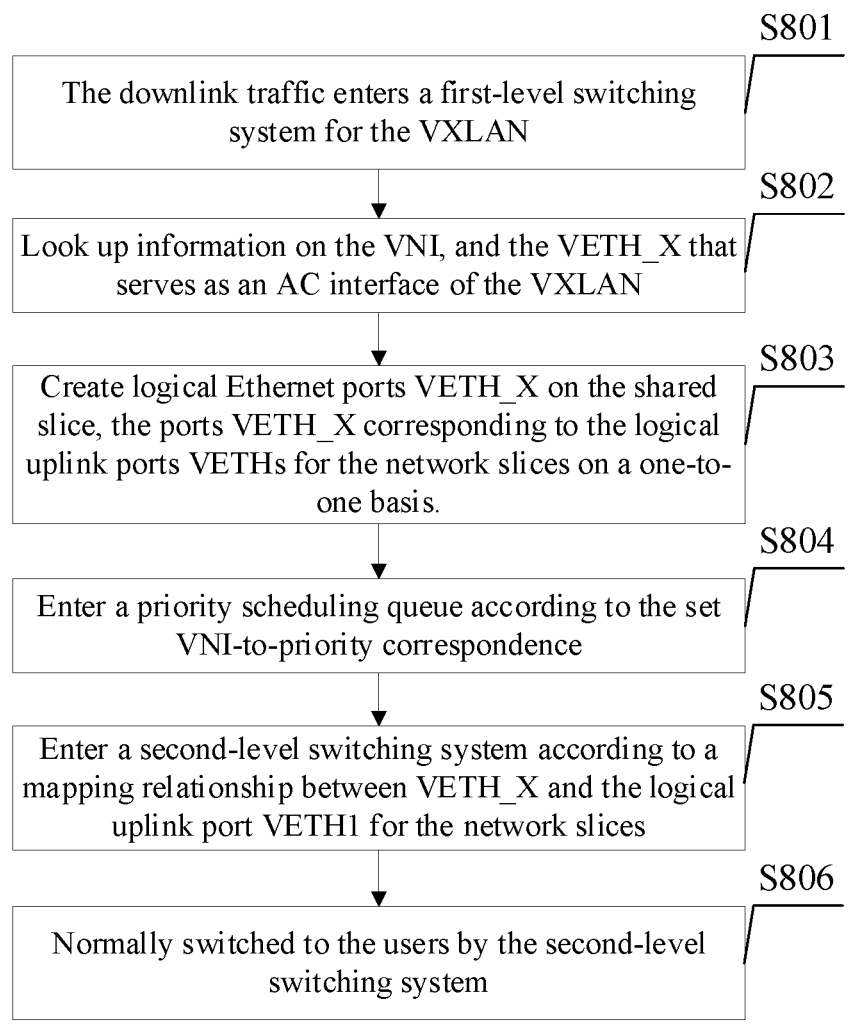
FIG. 8 is a flowchart of a method for the two-level switching system of example embodiment III of the present disclosure.

As shown in FIG. 8, the method for the two-level switching system includes the following steps.

At S801, the downlink traffic enters a first-level switching system for the VXLAN.

At S802, information on the VNI and the VETH_X1 that serves as an AC interface of the VXLAN is looked up.

At S803, the traffic enters a priority scheduling queue according to the set VNI-to-priority correspondence, where the higher the priority of the message in the queue, the higher the priority of the message to be switched into the slice.

At S804, when the message is switched out of the queue, it enters the second-level switching system according to the mapping relationship between the VETH_X1 and the logical uplink port VETH1 of the network slices. At this time, without checking the MAC, the message is directly switched to the slices according to the one-to-one mapping relationship for the logical ports.

At S805, after the message enters the second-level switching system, that is, after it is switched to the slices, it is normally switched to the users by the second-level switching system switching system.

Example Embodiment IV

Figure 9:
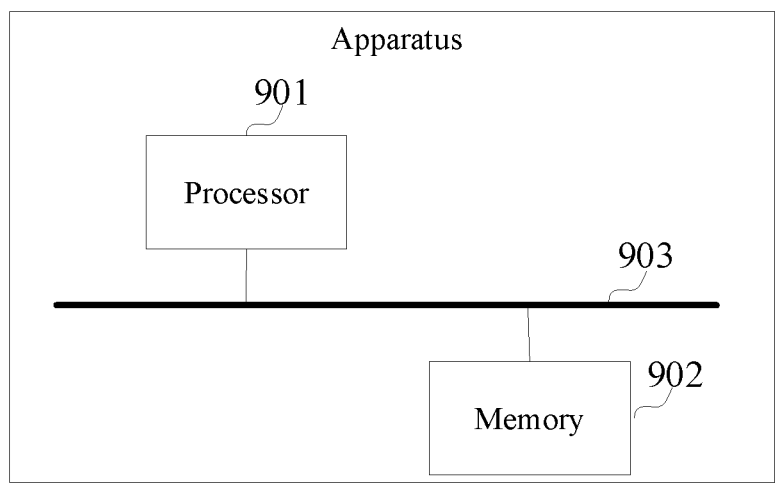
FIG. 9 is a schematic diagram of an apparatus according to example embodiment IV of the present disclosure.

An embodiment of the present disclosure provides an apparatus that may be implemented in various forms. For example, the apparatus described in the embodiments of the present disclosure may include switching devices such as PONs, OLTs, switches, routers, etc. As shown FIG. 9, the apparatus includes a processor 901, a memory 902 and a communication bus 903. The communication bus 903 is configured to implement connection and communication between the processor 901 and the memory 902. The processor 901 is configured to execute one or more programs stored in the memory 902 to implement the method for sharing an uplink port among network slices as in the above embodiments.

An embodiment of the present disclosure further provides a storage medium storing one or more programs, where the one or more programs are executable by one or more processors to implement the method for sharing an uplink port among network slices as in the above embodiments.

The storage medium includes a volatile or non-volatile, removable or non-removable medium implemented in any method or technology for storing information, such as computer-readable instructions, data structures, computer program modules, or other data. The computer-readable storage medium includes, but is not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, cassettes, magnetic tapes, magnetic disc storage or other magnetic storage devices, or any other media that can be configured to store desired information and can be accessed by computers.

The present disclosure has the following beneficial effects: in the method for sharing an uplink port among network slices, the apparatus, and the storage medium provided by the embodiments of the present disclosure, logical uplink ports are created for network slices; a one-to-one logical mapping is established between the logical uplink ports and access AC interfaces of a VXLAN in a shared slice; and the VXLAN is enabled in the shared slice, and service messages for the network slices are transmitted through a physical uplink port for the shared slice. In some implementation processes, an outgoing port is shared through the VXLAN for network communication with upstream devices, thus greatly saving port resources and simplifying the topology of connections of upstream network devices. In addition, in the process of establishing the logical mapping, the logical ports for the network slices may be switched without learning MAC (Media Access Control Address), thus greatly reducing the MAC learning process.

As can be seen, it should be understood by those having ordinary skill in the art that all or some of the steps in the methods disclosed above, functional modules/units in the systems and devices disclosed above may be implemented as software (which may be implemented by computer program code executable by a computing device), firmware, hardware, and appropriate combinations thereof. In a hardware embodiment, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skill in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a detailed description of several embodiments according to the present disclosure in conjunction with particular implementations, and specific implementations of the present disclosure should not be construed as being limited to the description. For those having ordinary skill in the art to which the present disclosure pertains, without departing from the concept of the present disclosure, several simple deductions or substitutions can be made, which should be regarded as falling within the scope of the present disclosure.

The invention claimed is:

1. A method for sharing an uplink port among network slices, comprising:
creating logical uplink ports for network slices;
establishing a one-to-one logical mapping between the logical uplink ports and access AC interfaces of a VXLAN in a shared slice; and
enabling the VXLAN in the shared slice, and transmitting service messages for the network slices through a physical uplink port for the shared slice.

2. The method for sharing an uplink port among network slices of claim 1, wherein establishing a one-to-one logical mapping between the logical uplink ports and access AC interfaces of a VXLAN in a shared slice comprises:
creating logical ports on the shared slice; and
corresponding the logical ports with the logical uplink ports on a one-to-one basis, the logical ports being the access AC ports of the VXLAN.

3. The method for sharing an uplink port among network slices of claim 2, wherein enabling the VXLAN in the shared slice comprises:
creating a VXLAN tunnel on the shared slice, the VXLAN tunnel comprising source IPs, destination IPs, and VNIs;
dividing different VTEPs according to the source IPs, the destination IPs, and the VNIs; and carrying communications of the VTEPs on the physical uplink port.

4. The method for sharing an uplink port among network slices of claim 3, wherein transmitting service messages for the network slices through a physical uplink port for the shared slice comprises:
performing VXLAN encapsulation after the service messages of the network slices are mapped to the AC interfaces through the logical uplink ports; and
transmitting the encapsulated service messages to peer devices according to the VTEPs to which the AC interfaces belong.

5. The method for sharing an uplink port among network slices of claim 4, further comprising:
transmitting, when transmitting the service messages for the network slices, layer-2 protocol messages in a layer-3 network by means of VXLAN encapsulation.

6. The method for sharing an uplink port among network slices of claim 1, wherein after transmitting service messages for the network slices through a physical uplink port for the shared slice, the method comprises:
looking up, in response to receiving data messages sent by peer devices, AC interfaces according to VNIs corresponding to VTEPs;
de-encapsulating the data messages to obtain payload messages; and
transmitting, according to the logical mapping of the AC interfaces and the logical uplink ports, the payload messages to corresponding network slices.

7. The method for sharing an uplink port among network slices of claim 6, wherein after de-encapsulating the data messages to obtain payload messages, the method comprises:
storing, according to a preset priority rule, the payload messages in a priority scheduling queue for priority scheduling.

8. The method for sharing an uplink port among network slices of claim 6, wherein after transmitting the payload messages to corresponding network slices, the method further comprises:
switching, in response to a user port being shared in at least two network slices, the payload messages from the network slices to the user port according to the principle of load balancing.

9. An apparatus, comprising:
a memory configured to stored at least one program;
a processor configured to execute the at least one program to implement a method for sharing an uplink port among network slices comprising:
creating logical uplink ports for network slices;
establishing a one-to-one logical mapping between the logical uplink ports and access AC interfaces of a VXLAN in a shared slice; and
enabling the VXLAN in the shared slice, and transmitting service messages for the network slices through a physical uplink port for the shared slice; and a communication bus configured to implement connection and communication between the processor and the memory.

10. A non-transitory computer-readable storage medium storing at least one program, wherein the at least one program are executable by at least one processor to implement the method for sharing an uplink port among network slices of claim 1.

11. A non-transitory computer-readable storage medium storing at least one program, wherein the at least one program are executable by at least one processor to implement the method for sharing an uplink port among network slices of claim 2.

12. A non-transitory computer-readable storage medium storing at least one program, wherein the at least one program are executable by at least one processor to implement the method for sharing an uplink port among network slices of claim 3.

13. A non-transitory computer-readable storage medium storing at least one program, wherein the at least one program are executable by at least one processor to implement the method for sharing an uplink port among network slices of claim 4.

14. A non-transitory computer-readable storage medium storing at least one program, wherein the at least one program are executable by at least one processor to implement the method for sharing an uplink port among network slices of claim 5.

15. A non-transitory computer-readable storage medium storing at least one program, wherein the at least one program are executable by at least one processor to implement the method for sharing an uplink port among network slices of claim 6.

16. A non-transitory computer-readable storage medium storing at least one program, wherein the at least one program are executable by at least one processor to implement the method for sharing an uplink port among network slices of claim 7.

17. A non-transitory computer-readable storage medium storing at least one program, wherein the at least one program are executable by at least one processor to implement the method for sharing an uplink port among network slices of claim 8.

* * * * *